(12) United States Patent
Ponder et al.

(10) Patent No.: US 9,982,179 B2
(45) Date of Patent: *May 29, 2018

(54) REFRIGERANT WITH LUBRICATING OIL FOR REPLACEMENT OF R22 REFRIGERANT

(76) Inventors: Kenneth M. Ponder, Cumming, GA (US); Steffan Thomas, Jr., Buckhead, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/493,491

(22) Filed: Jun. 11, 2012

(65) Prior Publication Data
US 2012/0240602 A1   Sep. 27, 2012

Related U.S. Application Data

(63) Continuation of application No. 12/961,045, filed on Dec. 6, 2010, now Pat. No. 8,197,706, which is a continuation of application No. 10/937,736, filed on Sep. 8, 2004, now abandoned.

(60) Provisional application No. 60/501,049, filed on Sep. 8, 2003.

(51) Int. Cl.
C09K 5/04      (2006.01)
C10M 171/00    (2006.01)

(52) U.S. Cl.
CPC ......... *C09K 5/045* (2013.01); *C10M 171/008* (2013.01); *C09K 2205/22* (2013.01); *C09K 2205/43* (2013.01); *C10M 2203/1065* (2013.01); *C10M 2223/041* (2013.01); *C10N 2220/302* (2013.01); *F25B 2400/18* (2013.01)

(58) Field of Classification Search
CPC . C09K 5/045; C09K 2205/22; C09K 2205/43
See application file for complete search history.

(56) References Cited

U.S. PATENT DOCUMENTS 6,207,071 B1   3/2001   Takigawa et al.

OTHER PUBLICATIONS

List of refrigerants from Wikipedia, https://en.wikipedia.org/wiki/List_of_refrigerants, last modified on Jan. 19, 2017, 13 pages.
(Continued)

*Primary Examiner* — John R Hardee
(74) *Attorney, Agent, or Firm* — Thomas | Horstemeyer, LLP

(57) ABSTRACT

An apparatus and method wherein potential ozone layer-damaging chlorodifluoromethane (Refrigerant R-22) is substituted with a mix of less environmentally damaging refrigerants pentafluoroethane and tetrafluoroethane in chlorodifluoromethane-based air-cooling systems mainly in residential cooling. While less environmentally damaging than chlorodifluoromethane, the substitute refrigerant has a temperature-pressure relationship similar to that of chlorodifluoromethane, making the substitute refrigerant suitable for use with chlorodifluoromethane-based air-cooling systems. In this event, it is mixed with a relatively small percentage of a lubricating oil which is compatible with both the unit refrigerant and typical R-22 system design.

37 Claims, 1 Drawing Sheet

(56) References Cited

OTHER PUBLICATIONS

Environmental Protection Agency (EPA), Air and Radiation Stratospheric Protection Division 6205J, "Substitute Refrigerants Under SNAP as of Oct. 4, 2011", SNAP Information: http://www.epa.gov/ozone/snap, 18 pages.

ANSI/ASHRAE Addenda a, b, c, e, f, k, n, o, p, q, r, s, and u to ANSI/ASHRAE Standard 34-2004, "Designation and Safety Classification of Refrigerants", 2006 Supplement, ISSN 1041-2336, 35 pages.

REFRIGERANT WITH LUBRICATING OIL FOR REPLACEMENT OF R22 REFRIGERANT

RELATED APPLICATION

This application, mineral oil, synthetic alkyl aromatic lubricants, and mixtures thereof is a continuation of U.S. patent application Ser. No. 12/961,045 filed Dec. 6, 2010, which is a continuation of U.S. patent application Ser. No. 10/937,736 filed Sep. 8, 2004, which claims priority to and the benefit of provisional application Ser. No. 60/501,049 filed Sep. 8, 2003.

BACKGROUND OF THE INVENTION

1. Field of the Invention

The present invention relates to the replacement of Refrigerant R-22 (chlorodifluoromethane) refrigerant with a blend refrigerant that is less damaging to the ozone layer in systems designed to use Refrigerant R-22 (chlorodifluoromethane). More particularly the present invention relates to an improved refrigerant composition, method and apparatus for refrigeration wherein two non-Refrigerant R-22 refrigerants are mixed in a defined ratio such that the temperature-pressure relationship of the mix approximates that of Refrigerant R-22 (chlorodifluoromethane). The mixture is compatible with Refrigerant R-22 (chlorodifluoromethane) so that it can be added to supplement and replace Refrigerant R-22 (chlorodifluoromethane). A further particularity of the instant invention relates to an improved method and apparatus for refrigeration wherein refrigerant mixture is mixed with a soluble lubricating oil to provide lubrication to the apparatus. The lubricant is soluble in both the mixture of the invention and Refrigerant R-22 (chlorodifluoromethane) refrigerant.

2. General Background

Until recently, R-22 refrigerant chlorodifluoromethane (hereinafter sometimes called "Refrigerant R-22 (chlorodifluoromethane)") was the major, if not sole refrigerant, used in residential air-conditioners, refrigerators, freezers and window air-conditioning units. Refrigerant R-22 (chlorodifluoromethane) is a trademark of E. I. du Pont de Nemours & Co. Inc. for chlorodifluoromethane. Hereinafter, "Refrigerant R-22 (chlorodifluoromethane)" is used in this specification to denote chlorodifluoromethane, regardless of the source.

Recently, however, Refrigerant R-22 (chlorodifluoromethane) has come under attack both nationally and internationally as an ozone layer-damaging chemical. In recent years, both the national and international scientific communities have linked Refrigerant R-22 (chlorodifluoromethane) with damage to the earth's protective ozone layer. Air-conditioners, refrigerator/freezers and window air-conditioning units containing R-22 are believed to be a global source of ozone-damaging material.

In response to scientific concern and a national and global outcry over the use of Refrigerant R-22 (chlorodifluoromethane) in air-conditioning, the United States Congress has acted to first reduce and then ban the use of Refrigerant R-22 (chlorodifluoromethane) in air-conditioning units.

As a first step toward phasing out the use of Refrigerant R-22 (chlorodifluoromethane) in air-conditioning units, Congress is phasing out the use of Refrigerant R-22 (chlorodifluoromethane) in new equipment effective Jan. 1, 2015 and has banned the sale of Refrigerant R-22 (chlorodifluoromethane) in any size container as of Jan. 1, 2020. One of the first areas in which the use of Refrigerant R-22 (chlorodifluoromethane) is to be phased out is in the Bakery industry under the Bakery Partnership Program. Another step in phasing out the use of R-22 is the import restrictions that begin in 2003, limiting the amount of R-22 that can be imported into the United States.

At the time of this application, the vast majority of residential, window units and freezers in use in the United States contain Refrigerant R-22 (chlorodifluoromethane).

Prior to banning the sale of quantities of Refrigerant R-22 (chlorodifluoromethane), owners of equipment with Refrigerant R-22 (chlorodifluoromethane)-based air-conditioning units are able to purchase the level of refrigerant in their equipment with only the need of a refrigerants license as required by the Clean Air Act. Millions of units containing refrigerant R-22 (chlorodifluoromethane) were sold in the United States prior to the start of mandatory phase out set forth by Congress and the international community.

Refrigerant R-22 (chlorodifluoromethane) recharging typically involves 30 lb. cans or cylinders typically used in the HVAC/R industry. The cylinders are fitted with a dispensing outlet compatible with a commercially available refrigeration manifold. In order to recharge an air-conditioning system, a customer needs to only fit the can or cylinder to the manifold and discharge, or "add to" the refrigerant charge directly into the air conditioning system.

Following Congress's ban on the sale of Refrigerant R-22 (chlorodifluoromethane) millions of equipment owners with Refrigerant R-22 (chlorodifluoromethane)-based air-conditioning units will be left with no choice other than to seek replacement refrigerants to service these units. Intentionally mixing of refrigerants is currently illegal by standards set forth by the Clean Air Act. An example would be for this application is that current R-22 units could not be mixed with this invention intentionally.

In response to Congress's ban on the use of Refrigerant R-22 (chlorodifluoromethane) in air-conditioning, service dealers have began to retrofit existing Refrigerant R-22 (chlorodifluoromethane)-based air-conditioning units with new, non-R-22 refrigerants, such as R410A (a 50/50 mixture of difluoromethane and pentafluoroethane), R417 (a 46/50/4 mixture of pentafluoroethane, 1,1,1,2-tetrafluoroethane, and butane) or R407C (a 23/25/52 mixture of difluoromethane, pentafluoroethane, and 1,1,1,2-tetrafluoroethane). None of these replacements contain a lubricant when produced.

The refrigerants that will be authorized by the Environmental Protection Agency (EPA) to replace Refrigerant R-22 (chlorodifluoromethane) in air conditioners is currently under review and will evolve to require a environmentally safe refrigerant, with a 0 odp factor like the one of the present invention described herein. Unfortunately, most replacements for R-22 have a markedly different temperature-pressure relationship at most operating temperatures than Refrigerant R-22 (chlorodifluoromethane).

Because of this difference in the temperature-pressure relationship of Refrigerant R-22 (chlorodifluoromethane) and current replacement refrigerants, existing Refrigerant R-22 (chlorodifluoromethane)-based systems cannot typically be interchanged. Hence, non-retrofitted, Refrigerant R-22 (chlorodifluoromethane)-based units have a need for a refrigerant that will fulfill the requirements of the system design while also meeting the requirements of the EPA and the international community.

Simply mixing refrigerants with existing Refrigerant R-22 (chlorodifluoromethane) in order to replenish, or "topping off" the level is against the law and not feasible. When other refrigerants are mixed with Refrigerant R-22 (chlorodifluoromethane), the mixture can take on the pressure characteristics of a substance that could be harmful to either the equipment or the operator. The temperature-pressure relationship becomes markedly different from that of Refrigerant R-22 (chlorodifluoromethane) at temperatures within the normal refrigerant operating temperature range and typical use of R-22.

Hence, in the absence of Refrigerant R-22 (chlorodifluoromethane) owners of equipment with Refrigerant R-22 (chlorodifluoromethane)-based air conditioners face but one choice when the level of their air-conditioning coolant is low: professional service—at a significant cost—to remove the existing Refrigerant R-22 (chlorodifluoromethane), and retrofit the system compatible with some kind of refrigerant gas.

R-22 refrigerants were developed to replace the prior, now banned R-12 refrigerant, or dichlorodifluoromethane. R-12 is sometimes referred to as FREON 12®, which is a trademark of E.I. du Pont de Nemours & Co. for dichlorodifluoromethane.

Thomas et al. (U.S. Pat. No. 5,254,280) discloses a lubricant developed for use with a refrigerant known as R134a (1,1,1,2-tetrafluoroethane) and the combination of that lubricant with a refrigerant, which is a replacement for R-12. The lubricant contains polyoxyalkylene glycol, which is hydrophilic and could damage the system as discussed below.

Wilczek (U.S. Pat. No. 5,384,057), Gorski (U.S. Pat. No. 4,971,712), and Anton of DuPont (U.S. Pat. No. 5,145,594) disclose other R-12 replacements in the form of a blend of certain synthetic lubricants in various R134a and R134a/R125 refrigerant systems. The DuPont patents discuss a gas known as R125 (pentafluoroethane). R125 is five fluorine atoms bonded to an ethane molecule. This is a very large molecule for a refrigerant. It is currently being produced for refrigeration only. Anton discloses the use of a lubricant comprising at least one cyanocarbon compound. Wilczek discloses a fluorosiloxane as a lubricant. Gorski discloses a polyakylene glycol as a lubricant.

Systems that contain R-22, or R-12 replacements, are still being produced today. These older systems have common components: R-22, R-22 mineral oil lubricant, and water that is sequestered into the dryer. If R134a (1,1,1,2-tetrafluroethane) were added to the system, it would damage the system as follows: (1) if no lubricant is added to the R134a (as in U.S. Pat. No. 4,953,312 to Tamura et al.), then the R-22 system would be starved for lubricant, since the R134a gas is not miscible with the mineral oil lubricant; (2) if a synthetic lubricant is added to the R134a (as in Thomas et al.), then there is a different problem—that of moisture. Older systems can have water trapped in their dryers. The synthetic lubricants (such as polyglycol- or polysiloxane-based lubricants) are hydrophilic. Thus, they are not only miscible with R-22 and R134a; they are also partially or completely miscible with water. Thus, if they are introduced into an R-22 system, they will pull this water out of the dryer into the refrigerant flow, initiating corrosion and damage to pressure switches and the TX valve and possible other system components. This is why Elf Atochem and DuPont, to name a few publish elaborate flushing procedures and high efficiency dryer change-outs to prevent damage to the cooling system.

Weber (U.S. Pat. No. 5,942,149) discloses yet another R-12 replacement consisting of a blend of chlorodifluoroethane, tetrafluoroethane and a napthenic lubricating oil.

SUMMARY OF THE PRESENT DISCLOSURE

The present disclosure is of a method and apparatus that are environmentally sound alternatives to the use of Refrigerant R-22 (chlorodifluoromethane) as a refrigerant. More particularly, the invention provides a mixture of at least two refrigerants that are miscible with each other, and compatible with Refrigerant R-22 (chlorodifluoromethane) while at the same time possessing a temperature-pressure profile that approximates that of Refrigerant R-22 (chlorodifluoromethane) over the operating range of ambient temperatures usually encountered by air conditioning units or other apparatus utilizing Refrigerant R-22 (chlorodifluoromethane) as a refrigerant. The invention also provides a lubricant, that is compatible with both the environmentally sound refrigerant of the invention and with Refrigerant R-22 (chlorodifluoromethane), so that mixtures of the refrigerant according to the invention and Refrigerant R-22 (chlorodifluoromethane) may be utilized with this lubricant in the refrigeration systems without deleterious effect upon moving parts of the refrigerating apparatus that require lubrication from the refrigerant.

More particularly, the refrigerant and method disclosed herein involves a mixture of pentafluoroethane and tetrafluoroethane in specific proportions that provide a temperature-pressure relationship that approximates that of Refrigerant R-22 (chlorodifluoromethane) over the range of ambient temperature operating conditions in which Refrigerant R-22 (chlorodifluoromethane) is a useful refrigerant. The pentafluoroethane/tetrafluoroethane refrigerant blend disclosed herein is compatible with both synthetic and mineral oils. The tetrafluoroethane can be either 1,1,1,2-tetafluoroethane or 1,1,2,2-tetrafluoroethane. In an exemplary embodiment, the refrigerant according to the invention comprises a ratio of from about 40 to about 45 weight percent pentafluoroethane to about 55 to about 60 percent 1,1,1,2-tetrafluoroethane, based upon the total weight of pentafluoroethane and 1,1,1,2-tetrafluoroethane. In a further exemplary embodiment, the refrigerant includes the ratio of about 42 weight percent pentafluoroethane to about 58 weight percent 1,1,1,2-tetrafluoroethane.

In addition, the refrigerant according to the invention also includes from about 0 to about 20 weight percent (based on the combined weight of pentafluoroethane and 1,1,1,2-tetrafluoroethane) of a lubricating oil that is soluble in chlorodifluoromethane, pentafluoroethane, and 1,1,1,2-tetrafluoroethane. In a preferred embodiment the lubricating oil is present in the range of from about 0.5 to about 2% by weight of the refrigerant mixture.

In an exemplary embodiment, the lubricating oil is a napthenic or paraffinic based lubricating oil. In a further exemplary embodiment, the lubricant is selected from those lubricants sold by Anderol, Inc., East Hanover, N.J., an affiliate of Royal Lubricants Company, under the trademark ROYCO® 2302. ROYCO® 2302 is a napthenic oil lubricant having the following composition:

65-85% hydrotreated light napthenic distillate,
10-20% solvent refined light napthenic distillate petroleum,
<0.5% butylated triphenyl phosphate, and
<2% minor additive.

In another exemplary embodiment, the lubricating oil can be a synthetic lubricating oil, or a mixture of oils, that is soluble in the mixture of the chlorodifluoroethane and tetrafluoroethane. A suitable synthetic lubricant is a man-made, synthetic alkyl aromatic lubricant. Suitable synthetic lubricants include alkylated benzene lubricants.

The lubricant can be either a synthetic alkyl aromatic lubricant, such as alkylbenzene, alone, or a mixture of a synthetic alkyl aromatic lubricant and mineral oil or a mixture of a synthetic alkyl aromatic lubricant and polyol ester (POE). When so mixed, it is preferred, but not required, that a minor portion of the mixture be mineral oil or POE. By minor portion, we mean less than 50% by weight of the blended refrigerants. Alternatively, either mineral oil or polyol ester (POE) can be used alone.

While it is intended that the substitute refrigerant according to the invention may be utilized to replace Refrigerant R-22 (chlorodifluoromethane) that has escaped from apparatus, the substitute refrigerant of the invention may also be utilized to completely refill apparatus that have been designed for use with Refrigerant R-22 (chlorodifluoromethane), since the refrigerant has a temperature-pressure profile that closely approximates that of Refrigerant R-22 (chlorodifluoromethane). Thus, when the refrigerant is used as a complete replacement for Refrigerant R-22 (chlorodifluoromethane), it is no longer necessary that the lubricant be compatible with chlorodifluoromethane but only that it should be compatible with 1,1,1,2-tetrafluoroethane and pentafluoroethane.

Further, whereas the substitute refrigerant of the invention is less damaging to the ozone layer than Refrigerant R-22 (chlorodifluoromethane) and is useful in air conditioning units, and in particular residential type air-conditioning units, it is not so limited in its use. Indeed, the refrigerant may be utilized as a substitute or replacement for Refrigerant R-22 (chlorodifluoromethane) in virtually any application, thereby eliminating the use of ozone layer-damaging Refrigerant R-22 (chlorodifluoromethane).

In further specifics, the invention provides a canister containing a mixture of tetrafluoroethane and pentafluoroethane with a napthenic oil that may be fitted with an outlet manifold that is compatible with a Refrigerant R-22 (chlorodifluoromethane) recharging manifold that is typically used to recharge an apparatus with the latter refrigerant. Refrigerant may then be allowed to flow from the container through the manifold and into the apparatus to replace Refrigerant R-22 (chlorodifluoromethane) refrigerant that has been lost from the refrigeration system.

When mixing the components of the refrigerant blend of the present invention, one should first mix the lubricant with the tetrafluoroethane, then mix that mixture with the pentafluoroethane in the proportions afore mentioned. Otherwise, the product does not mix properly.

In an exemplary form, the lubricant has a viscosity of 5 to 500 centistokes, more preferably 5 to 100 centistokes, even more preferably 5 to 50 centistokes, and most preferably 5 to 10 centistokes. The lubricant having a viscosity of 5 to 10 centistokes is preferred.

In an exemplary embodiment, the percentage by weight of lubricant in the refrigerant blend is 0-20%, preferably 0.5-2%, more preferably 1-2%, even more preferably 1.25-2%, and most preferably 1.5-1.75%. The percentage by weight of lubricant in the refrigerant blend is, for example, 1.75.+-.0.05%.

A suitable lubricant is severely hydro treated napthenic/paraffinic lubricant, such as the aforementioned ROYCO® 2302. Other suitable lubricants include Sunpar 82280 (a paraffinic based lubricant), Lubrizol 403, Sunthene 200 (a napthenic based lubricant) and L30 or L35 from Shrieve Chemical Company, The Woodlands, Tex., or Zerol 150 from Nu-Calgon Wholesale, Inc., St. Louis, Mo., or AB150 from Virginia KMP Corporation, Dallas, Tex. (alkylbenzene synthetic lubricants). Mobil One 5-weight synthetic oil (it is hydrophobic) could also work as a lubricant, but it is relatively expensive.

In order for the parts of the refrigerant system to function best, 0.5-20% of total weight of refrigerant should be lubricant. When adding the refrigerant blend to a refrigerant system, one should leave the lubricant in the system if one for some reason takes out the Refrigerant R-22.

The lubricating of the present system is miscible with the pentafluoroethane and tetrafluorethane blend and with R-22 refrigerant. This allows for mixing of residual R-22 refrigerant and the refrigerant of the present invention, without the release of significant amounts of residual water in the dryer and subsequent system damage (as will happen if the synthetic lubricants disclosed in Thomas et al. and the DuPont patents are used). While alkylbenzene alone is considered not miscible with tetrafluoroethane (in particular R134a), it is sufficiently soluble in the present tetrafluoroethane/chlorodifluoroethane mixture. This solubility allows the replacement refrigerant blend to lubricate the system, preventing damage to the compressor and component parts of the system.

Various optional additives can be included in the lubricant. A corrosion inhibitor can be included. (otherwise corrosion will probably occur within 6 months). An exemplary corrosion inhibitor is one for anhydrous systems (such corrosion inhibitors comprise calcium, or phosphate salts). The corrosion inhibitor can be bonded to the lubricant. Additionally, a surfactant and/or a foaming agent can be included.

The present refrigerant blend is designed to be utilized as a R-22 replacement in refrigeration systems. It is designed as a replacement, in which little or no modifications including parts are used to adapt the system for the refrigerant of the present invention.

The present refrigerant blend can be used as a replacement for R-22 refrigerant, typically deminimus without retrofitting the air conditioning system or flushing it out. It is recommended that a full vacuum be obtained before adding the refrigerant to the present invention.

BRIEF DESCRIPTION OF THE DRAWINGS

Many aspects of the disclosure can be better understood with reference to the following drawings.

DETAILED DESCRIPTION OF THE PREFERRED EMBODIMENT

Figure 1:
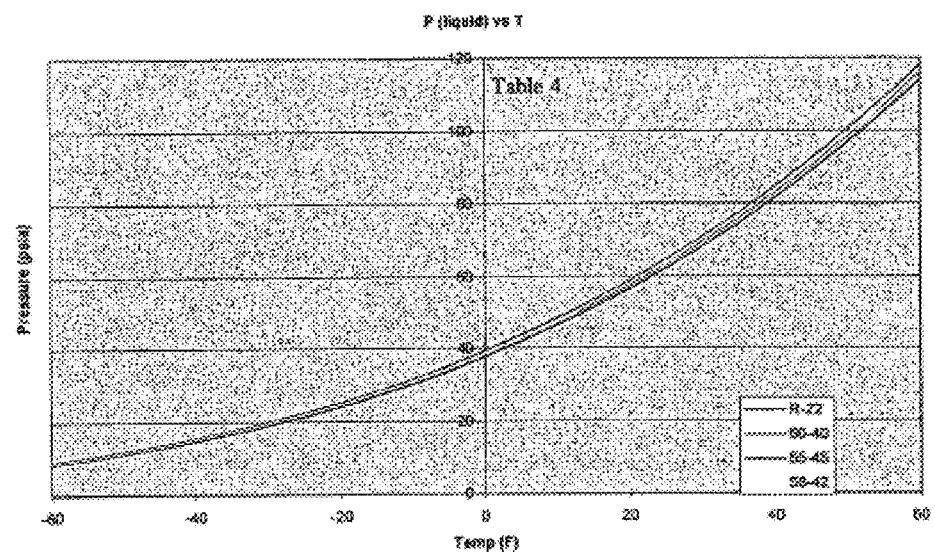
FIG. 1 illustrates pressure versus temperature profiles for various blends of the present disclosure in comparison to R-22.

The present disclosure provides a mixture of non-Refrigerant 22 refrigerants that are less damaging to the Earth's ozone layer and that are approved by the U.S. Environmental Protection Agency for use in air-conditioners. The invention mixture is compatible with Refrigerant R-22 (chlorodifluoromethane) and can be used to replace existing Refrigerant R-22 (chlorodifluoromethane)-in R-22 based refrigeration systems. It is expected that the present invention will gradually replace Refrigerant R-22 (chlorodifluoromethane) in Refrigerant R-22 (chlorodifluoromethane)-based air-cooling systems, without the need to retrofit existing Refrigerant R-22 (chlorodifluoromethane)-based systems for non-Refrigerant 22 replacement refrigerants.

Specifically, the present refrigerant blend includes a mixture of pentafluoroethane and tetrafluorethane packaged with a compatible lubricating oil, provided under pressure in a can or cylinder equipped with an outlet compatible with existing Refrigerant R-22 (chlorodifluoromethane) recharging kit manifolds, so that the refrigerant and lubricant mixture can be added to existing Refrigerant R-22 (chlorodifluoromethane) based coolant systems. Also, the invention provides the possibility of using new refrigerant systems, originally designed for "Refrigerant R-22 (chlorodifluoromethane)," by supplying an EPA-approved refrigerant so that retrofitting to new equipment use is not required.

In an exemplary embodiment, the invention provides a cylinder can like the standard 25 or 30 lb. can formerly used for containing "Refrigerant R-22 (chlorodifluoromethane)," but containing about 58% by weight 1,1,1,2-tetrafluorethane and about 42% by weight pentafluoroethane. The can also contains the preferred lubricant, ROYCO® 2302 in solution with the coolant mixture at a percent by weight of between 0.5% and 2%.

Existing Refrigerant R-22 (chlorodifluoromethane)-based air-conditioning systems use an amount of a vegetable or hydrocarbon mineral oil to lubricate the compressor. This oil has a very low vapor pressure, and is not soluble with pure tetrafluoroethane, particularly 1,1,1,2-tetrafluoroethane. Hence, adding tetrafluoroethane to replace Refrigerant R-22 (chlorodifluoromethane) in existing Refrigerant R-22 (chlorodifluoromethane)-based air-conditioning systems leads to compressor breakdown from lack of sufficient lubrication. The invention provides lubricants that are compatible with the invention mixture of tetrafluoroethane and pentafluoroethane, and with "Refrigerant R-22 (chlorodifluoromethane)," and that are suitable for lubricating refrigerant compressors and other air-conditioner component parts. The lubricants disclosed herein, on the other hand, are soluble in a tetrafluoroethane/pentafluoroethane mixture. This solubility allows the replacement refrigerant blend to lubricate the air-conditioning system, preventing damage to the compressor and component parts of the system.

Example 1

Table 1 summarizes the results of solubility tests of a 2% by weight solution of ROYCO® 2302 oil lubricant in an 58/42% by weight mixture of 1,1,1,2-tetrafluoroethane and pentafluoroethane refrigerants. ROYCO® 2302 oil (available from ANDEROL®, Inc., an affiliate of Royal Lubricants Co.), was added to a clear Fisher-Porter pressure burette and a mixture of 1,1,1,2-tetrafluoroethane/pentafluoroethane in an 58/42 ratio by weight was introduced under pressure to maintain the liquid state.

TABLE 1

| Full Burette | clear no separation |
|---|---|
| ⅔ Full Burette | clear no separation |
| ½ Full Burette | clear no separation |
| ⅓ Full Burette | clear no separation |
| Almost Empty Burette | clear no separation |

Note: The color of the fluid remained the same as the burette was emptied. The expelled gas deposited the oil onto a test panel.

Example 2

1,1,1,2-tetrafluoroethane and pentafluoroethane are mixed with the napthenic oil lubricant at set ratios such that the temperature-pressure profile of the mixture is similar to that of Refrigerant R-22 (chlorodifluoromethane), over the normal operating range of air-conditioners. Table 2 summarizes the results of tests of the temperature-pressure profiles of various mixes of 1,1,1,2-tetrafluoroethane and pentafluoroethane over the range of normal air-conditioner working temperatures, from −60 degree. F. to 160. degree. F.

For Table 2, different percentages of 1,1,1,2-tetrafluoroethane and pentafluoroethane—by weight—were mixed with the lubricant to show the pressure temperature relationships of the various invention combinations.

FIG. 1 shows Pressure (liquid) vs. Temperature profiles for R-22 and blends of 40/60, 45/55 and 42/58 of tetrafluoroethane and pentafluoroethane, respectively.

Figure 2:
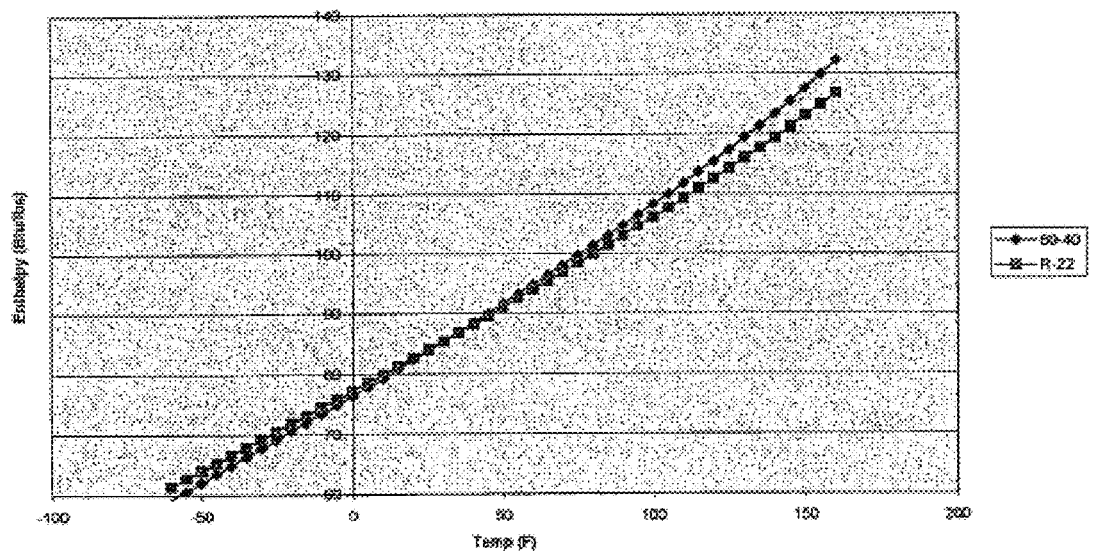
FIG. 2 compares the temperature versus enthalpy profile of an exemplary embodiment of the present disclosure to R-22.

FIG. 2 shows Temperature vs. Enthalpy profiles comparing a blend of 40/60 tetrafluoroethane and pentafluoroethane to R-22.

The blend of refrigerants tetrafluoroethane and pentafluoroethane of the present disclosure shows the following properties of interest:

| | |
|---|---|
| Dew Point | @ −32 F. |
| Bubble Point | @ −41.5 F. |
| Glide | @ 9.5 F. |

An exemplary blend of refrigerants is about 42% by weight pentafluoroethane and about 58% by weight 1,1,1,2-tetrafluoroethane. This is the ratio of pentafluoroethane to 1,1,1,2-tetrafluoroethane with the lubricant where the mixture of the invention shows the greatest similarity to "Refrigerant R-22 (chlorodifluoromethane)", over most operating temperatures.

The apparatus and method of the preferred embodiment encompass the use of a mixture of 1,1,1,2-tetrafluoroethane and pentafluoroethane at the ranges, as discussed above, with a lubricating oil at ranges, as discussed above of about 0.5% to about 2% by weight in the operation of an air-conditioning system, wherein the coolant-oil mixture replaces Refrigerant R-22 (chlorodifluoromethane) in a Refrigerant R-22 (chlorodifluoromethane)-based refrigeration system.

The method and apparatus in the preferred embodiment further details providing the above described mix of pentafluoroethane/1,1,1,2-tetrafluoroethane and lubricating oil in 30 lb. cylinders, where the cylinders are pressure sealed and fitted with an outlet compatible for existing Refrigerant 22-type refrigeration manifolds typically ¼ inch male flare.

Further, it was noted that the systems tested ran more smoothly and the compressor showed less vibration during the test period, as the mixture of the invention was added. It is theorized that the lubricating oil, being soluble in the refrigerant gasses, was better able to lubricate the compressor and reciprocating parts than the existing Refrigerant R-22 (chlorodifluoromethane) lubricant used by itself. In some applications a reduction in power consumption may be also noted.

The refrigerant of the present invention can also be used as a replacement refrigerant for the new R-22 air-conditioning systems, such as the systems used in today's HFC-free units The ROYCO® 2302 napthenic oil lubricant of the present disclosure has a flash point of more than 150 degrees F. Pure refrigerant 1,1,1,2-tetrafluoroethane is not miscible with a napthenic lubricant like mineral oil or mineral seal oil (both of which could be used as the lubricants of the present invention). Pentafluoroethane is miscible with most napthenic lubricants, including mineral oils. The presence of the pentafluoroethane allows the use of mineral oils in the refrigerant blend and system of the present invention (a translucent, partially miscible blend is formed). The lubricant can advantageously be partially polymerized into longer chain molecules to allow it to function at very low percentage levels. The lubricant can be hydrotreated or polymerized for stability and wear resistance.

Phosphated additives add corrosion resistance in the presence of acids and salts and increase wear resistance. Calcium additives help the lubricant resist rust and the effects of corrosion; calcium salts reduce the corrosive effects of hydrochloric acid that is formed in the presence of water and the chlorinated gases present in the refrigerant systems of the present invention.

The ROYCO® lubricants mentioned above contain the corrosion inhibitors mentioned above and can also contain acrylic polymer. It is believed that the function of the acrylic polymer is to increase wear resistance under severe conditions. Acrylics can help film formation, and the ability of the lubricant to coat metal and soft parts and stay in place.

The lubricant of the present invention is miscible with R-22, the R-22 lubricant, and the blend of the refrigerant gases of the present invention.

It should be understood that variations and modifications may be made of the invention herein taught, and that those are within the scope and spirit of the invention as taught above and claimed here below.

TABLE 2

| Temp (F.) | P (60-40) | P (58-42) | P (55-45) | P (R-22) |
|---|---|---|---|---|
| −60 | 8.982 | 8.81 | 8.552 | 8.836 |
| −55 | 10.36 | 10.16 | 9.87 | 10.19 |
| −50 | 11.9 | 11.68 | 11.35 | 11.7 |
| −45 | 13.62 | 13.37 | 12.99 | 13.39 |
| −40 | 15.52 | 15.24 | 14.82 | 15.26 |
| −35 | 17.63 | 17.32 | 16.84 | 17.34 |
| −30 | 19.96 | 19.61 | 19.08 | 19.62 |
| −25 | 22.52 | 22.13 | 21.54 | 22.14 |
| −20 | 25.33 | 24.9 | 24.25 | 24.91 |
| −15 | 28.41 | 27.93 | 27.21 | 27.93 |
| −10 | 31.76 | 31.23 | 30.44 | 31.23 |
| −5 | 35.42 | 34.83 | 33.96 | 34.82 |
| 0 | 39.39 | 38.74 | 37.79 | 38.73 |
| 5 | 43.69 | 42.98 | 41.94 | 42.96 |
| 10 | 48.34 | 47.57 | 46.43 | 47.54 |
| 15 | 53.36 | 52.52 | 51.27 | 52.48 |
| 20 | 58.76 | 57.85 | 56.5 | 57.79 |
| 25 | 64.57 | 63.58 | 62.11 | 63.51 |
| 30 | 70.8 | 69.73 | 68.14 | 69.65 |
| 35 | 77.48 | 76.33 | 74.61 | 76.22 |
| 40 | 84.62 | 83.38 | 81.52 | 83.26 |
| 45 | 92.25 | 90.9 | 88.91 | 90.76 |
| 50 | 100.4 | 98.93 | 96.79 | 98.76 |
| 55 | 109 | 107.5 | 105.2 | 107.3 |
| 60 | 118.2 | 116.6 | 114.1 | 116.3 |
| 65 | 128 | 126.2 | 123.6 | 125.9 |
| 70 | 138.4 | 136.5 | 133.6 | 136.1 |
| 75 | 149.3 | 147.3 | 144.3 | 146.9 |
| 80 | 160.9 | 158.8 | 155.6 | 158.3 |
| 85 | 173.2 | 170.9 | 167.5 | 170.4 |
| 90 | 186.1 | 183.7 | 180.1 | 183.1 |
| 95 | 199.8 | 197.2 | 193.3 | 196.5 |
| 100 | 214.2 | 211.4 | 207.3 | 210.6 |
| 105 | 229.3 | 226.4 | 222.1 | 225.5 |
| 110 | 245.3 | 242.2 | 237.6 | 241.1 |
| 115 | 262 | 258.7 | 253.9 | 257.5 |
| 120 | 279.6 | 276.1 | 271 | 274.7 |
| 125 | 298.1 | 294.4 | 289 | 292.7 |
| 130 | 317.5 | 313.6 | 307.8 | 311.6 |
| 135 | 337.8 | 333.7 | 327.6 | 331.4 |
| 140 | 359.1 | 354.8 | 348.3 | 352.1 |
| 145 | 381.4 | 376.8 | 370.1 | 373.7 |
| 150 | 404.8 | 400 | 392.8 | 396.4 |
| 155 | 429.3 | 424.2 | 416.7 | 420 |
| 160 | 454.9 | 449.5 | 441.6 | 444.7 |

What is claimed as the invention is:

1. In an apparatus designed for use with chlorodifluoromethane refrigerant, the improvement comprising substituting the chlorodifluoromethane with a refrigerant composition designed to achieve a phase change, the refrigerant composition comprising a combination of refrigerant gases, said refrigerant gases consisting of a blend of tetrafluoroethane and pentafluoroethane, the ratio of the tetrafluoroethane to the pentafluoroethane being selected such that the blend exhibits a dew point at about −32° F. or a bubble point at about −41.5° F. at about one standard atmosphere of pressure, wherein in the substitute refrigerant said pentafluoroethane is present in an amount of 59% to 57% by weight and said tetrafluoroethane is present in an amount of 41% to 43% by weight of the combined weight of the pentafluoroethane and tetrafluoroethane on the basis of the combined weights of said pentafluoroethane and said tetrafluoroethane totaling 100%, and wherein the refrigerant composition further comprises non-refrigerant gas components, said non-refrigerant gas components including a lubricating oil, wherein the lubricating oil is present up to about 20% by weight of the refrigerant gases and is soluble in chlorodifluoromethane, tetrafluoroethane and pentafluoroethanes wherein the lubricating oil is selected from the group consisting of mineral oil, synthetic alkyl aromatic lubricants, and mixtures thereof, and the tetrafluoroethane is 1,1,1,2-tetrafluoroethane.

2. In the apparatus of claim 1, wherein the blend exhibits a dew point at about −32° F. and a bubble point at about −41.5° F. at about one standard atmosphere of pressure.

3. In the apparatus of claim 1, wherein the apparatus is selected from the group consisting of refrigeration equipment, air-conditioning equipment, and HVAC equipment.

4. In the apparatus of claim 1, wherein the lubricating oil includes an additive selected from the group consisting of an acrylic polymer, a corrosion inhibitor, a surfactant, a foaming agent, and mixtures thereof.

5. In the apparatus of claim 1, wherein in the substitute refrigerant said pentafluoroethane is present in the ratio of about 58% by weight to said tetrafluoroethane present in an amount of about 42% by weight.

6. In the apparatus of claim 1, wherein the blend exhibits a glide at about 9.5° F.

7. In the apparatus of claim 1, wherein the blend exhibits a dew point of −32° F.

8. A method for refilling an apparatus designed for use with a chlorodifluoromethane refrigerant, the method comprising:

(1) selecting a substitute refrigerant composition designed to achieve a phase change and comprising a combination of refrigerant gases, the refrigerant gases consisting of a blend of tetrafluoroethane and pentafluoroethane, the ratio of the tetrafluoroethane to the pentafluoroethane being selected such that the blend exhibits a dew point at about −32° F. or a bubble point at about −41.5° F. at about one standard atmosphere of pressure, wherein in the substitute refrigerant said pentafluoroethane is present in an amount of 59% to 57% by weight and said tetrafluoroethane is present in an amount of 41% to 43% by weight of the combined weight of the pentafluoroethane and tetrafluoroethane on the basis of the combined weights of said pentafluoroethane and said tetrafluoroethane totaling 100%, (2) supplying the substitute refrigerant composition under pressure, in a cylinder can fitted with an outlet compatible with a chlorodifluoromethane recharging manifold of the apparatus; and (3) adding to said apparatus via the manifold the substitute refrigerant composition for chlorodifluoromethane, wherein the refrigerant composition further comprises non-refrigerant gas components, said non-refrigerant gas components including a lubricating oil, wherein the lubricating oil is present up to about 20% by weight of the refrigerant gases and is soluble in chlorodifluoromethane, tetrafluoroethane and pentafluoroethane, wherein the lubricating oil is selected from the group consisting of mineral oil, synthetic alkyl aromatic lubricants, and mixtures thereof, and wherein the tetrafluoroethane is 1,1,1,2-tetrafluoroethane.

9. The method of claim 8, wherein the blend exhibits a dew point at about −32° F. and a bubble point at about −41.5° F. at about one standard atmosphere of pressure.

10. The method according to claim 8, wherein the apparatus is selected from the group consisting of refrigeration equipment, air-conditioning equipment, and HVAC equipment.

11. The method according to claim 8, wherein the lubricating oil includes an additive selected from the group consisting of an acrylic polymer, a corrosion inhibit, a surfactant, a foaming agent, and mixtures thereof.

12. The method according to claim 8, wherein in the substitute refrigerant said pentafluoroethane is present in the ratio of about 58% by weight to said tetrafluoroethane present in an amount of about 42% by weight.

13. The method of claim 8, wherein the blend exhibits a glide at about 9.5° F.

14. The method of claim 8, wherein the blend exhibits a dew point of −32° F.

15. A refrigerant composition comprising a combination of refrigerant gases, the refrigerant gases consisting of a blend of tetrafluoroethane and pentafluoroethane, the ratio of the tetrafluoroethane to the pentafluoroethane being selected such that the blend exhibits a dew point at about −32° F. or a bubble point at about −41.5° F. at about one standard atmosphere of pressure, wherein in the substitute refrigerant said pentafluoroethane is present in an amount of 59% to 57% by weight and said tetrafluoroethane is present in an amount of 41% to 43% by weight of the combined weight of the pentafluoroethane and tetrafluoroethane on the basis of the combined weights of said pentafluoroethane and said tetrafluoroethane totaling 100%, and wherein the refrigerant composition further comprises non-refrigerant gas components, said non-refrigerant gas components including a lubricating oil, wherein the lubricating oil is present up to about 20% by weight of the refrigerant gases and is soluble in chlorodifluoromethane, tetrafluoroethane and pentafluoroethane, wherein the lubricating oil is selected from the group consisting of mineral oil, synthetic alkyl aromatic lubricants, and mixtures thereof, and wherein the tetrafluoroethane is 1,1,1,2-tetrafluoroethane.

16. The refrigerant composition of claim 15, wherein the blend exhibits a dew point at about −32° F. and a bubble point at about −41.5° F. at about one standard atmosphere of pressure.

17. The refrigerant composition according to claim 15, wherein the lubricating oil includes an additive selected from the group consisting of further includes an acrylic polymer, a corrosion inhibitor, a surfactant, a foaming agent, and mixtures thereof.

18. The refrigerant composition according to claim 15, wherein said pentafluoroethane is present in the ratio of about 58% by weight to said tetrafluoroethane present in an amount of about 42% by weight.

19. The refrigerant composition of claim 15, wherein the blend exhibits a glide at about 9.5° F.

20. The refrigerant composition of claim 15, wherein the blend exhibits a dew point of −32° F.

21. In an apparatus designed for use with chlorodifluoromethane refrigerant, the improvement comprising substituting the chlorodifluoromethane with a refrigerant composition designed to achieve a phase change, the refrigerant composition comprising a combination of refrigerant gases, said refrigerant gases consisting of a blend of tetrafluoroethane and pentafluoroethane, the ratio of the tetrafluoroethane to the pentafluoroethane being selected such that the blend exhibits a dew point at about −32° F. or a bubble point at about −41.5° F. at about one standard atmosphere of pressure, wherein in the substitute refrigerant said pentafluoroethane is present in an amount of 59% to 57% by weight and said tetrafluoroethane is present in an amount of 41% to 43% by weight of the combined weight of the pentafluoroethane and tetrafluoroethane on the basis of the combined weights of said pentafluoroethane and said tetrafluoroethane totaling 100%, and wherein the tetrafluoroethane is 1,1,1,2-tetrafluoroethane.

22. In the apparatus of claim 21, wherein the blend exhibits a dew point of −32° F.

23. In the apparatus of claim 21, wherein the blend exhibits a dew point at about −32° F. and a bubble point at about −41.5° F. at about one standard atmosphere of pressure.

24. In the apparatus of claim 21, wherein the blend exhibits a glide at about 9.5° F.

25. In the apparatus of claim 21, wherein in the substitute refrigerant said pentafluoroethane is present in the ratio of about 58% by weight to said tetrafluoroethane present in an amount of about 42% by weight.

26. A method for refilling an apparatus designed for use with a chlorodifluoromethane refrigerant, the method comprising:

(1) selecting a substitute refrigerant composition designed to achieve a phase change and comprising a combination of refrigerant gases, the refrigerant gases consisting of a blend of tetrafluoroethane and pentafluoroethane, the ratio of the tetrafluoroethane to the pentafluoroethane being selected such that the blend exhibits a dew point at about −32° F. or a bubble point at about −41.5° F. at about one standard atmosphere of pressure, wherein in the substitute refrigerant said pentafluoroethane is present in an amount of 59% to 57% by weight and said tetrafluoroethane is present in an amount of 41% to 43% by weight of the combined weight of the pentafluoroethane and tetrafluoroethane on the basis of the combined weights of said pentafluoroethane and said tetrafluoroethane totaling 100%, (2) supplying the substitute refrigerant composition under pressure, in a cylinder can fitted with an outlet compatible with a chlorodifluoromethane recharging manifold of the apparatus; and (3) adding to said apparatus via the manifold the substitute refrigerant composition for chlorodifluoromethane, and wherein the tetrafluoroethane is 1,1,1,2-tetrafluoroethane.

27. The method of claim 26, wherein the blend exhibits a dew point of −32° F.

28. The method of claim 26, wherein the blend exhibits a dew point at about −32° F. and a bubble point at about −41.5° F. at about one standard atmosphere of pressure.

29. The method of claim 26, wherein the blend exhibits a glide at about 9.5° F.

30. The method according to claim 26, wherein in the substitute refrigerant said pentafluoroethane is present in the ratio of about 58% by weight to said tetrafluoroethane present in an amount of about 42% by weight.

31. A refrigerant composition comprising a combination of refrigerant gases, the refrigerant gases consisting of a blend of tetrafluoroethane and pentafluoroethane, the ratio of the tetrafluoroethane to the pentafluoroethane being selected such that the blend exhibits a dew point at about −32° F. or a bubble point at about −41.5° F. at about one standard atmosphere of pressure, wherein in the substitute refrigerant said pentafluoroethane is present in an amount of 59% to 57% by weight and said tetrafluoroethane is present in an amount of 41% to 43% by weight of the combined weight of the pentafluoroethane and tetrafluoroethane on the basis of the combined weights of said pentafluoroethane and said tetrafluoroethane totaling 100%, and
wherein the tetrafluoroethane is 1,1,1,2-tetrafluoroethane.

32. The refrigerant composition of claim 31, wherein the blend exhibits a dew point of −32° F.

33. The refrigerant composition of claim 31, wherein the blend exhibits a dew point at about −32° F. and a bubble point at about −41.5° F. at about one standard atmosphere of pressure.

34. The method of claim 27, wherein the blend exhibits a glide at about 9.5° F.

35. The refrigerant composition according to claim 31, wherein said pentafluoroethane is present in the ratio of about 58% by weight to said tetrafluoroethane present in an amount of about 42% by weight.

36. In the apparatus of claim 21, wherein the apparatus is selected from the group consisting of refrigeration equipment, air-conditioning equipment, and HVAC equipment.

37. The method according to claim 26, wherein the apparatus is selected from the group consisting of refrigeration equipment, air-conditioning equipment, and HVAC equipment.

* * * * *